March 17, 1964 C. W. BEST ETAL 3,125,141
TIMBER INCISING APPARATUS
Filed Dec. 19, 1960 7 Sheets-Sheet 2
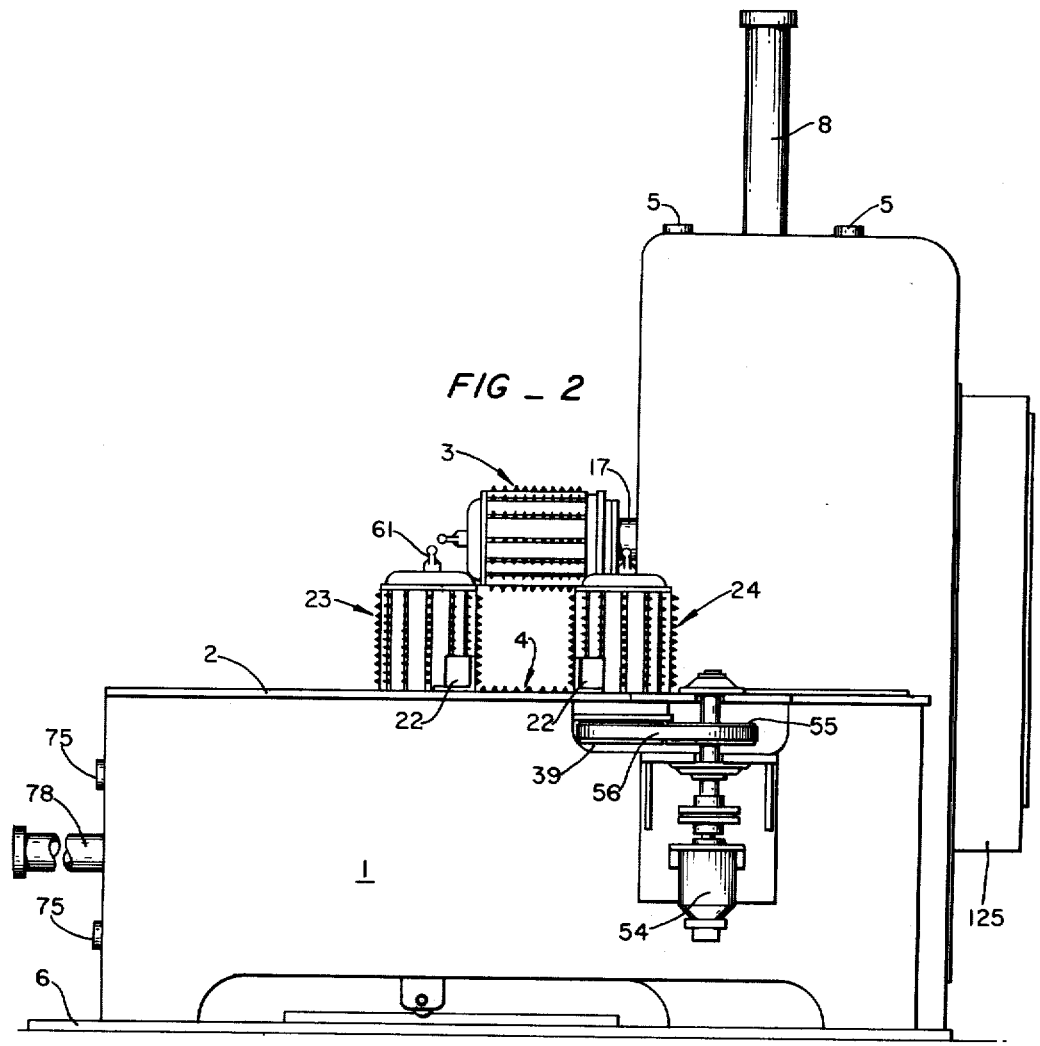
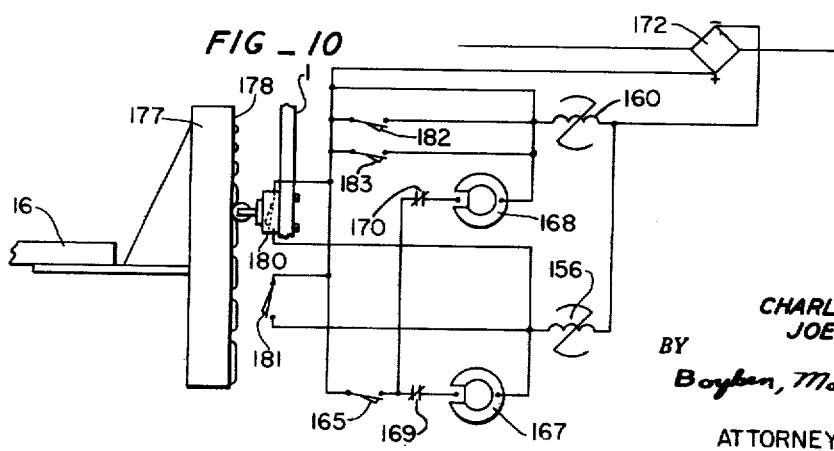
INVENTORS
CHARLES W. BEST
JOE T. NAPIER
BY
Boyken, Mohler + Wood
ATTORNEYS March 17, 1964    C. W. BEST ETAL    3,125,141
TIMBER INCISING APPARATUS
Filed Dec. 19, 1960    7 Sheets—Sheet 3
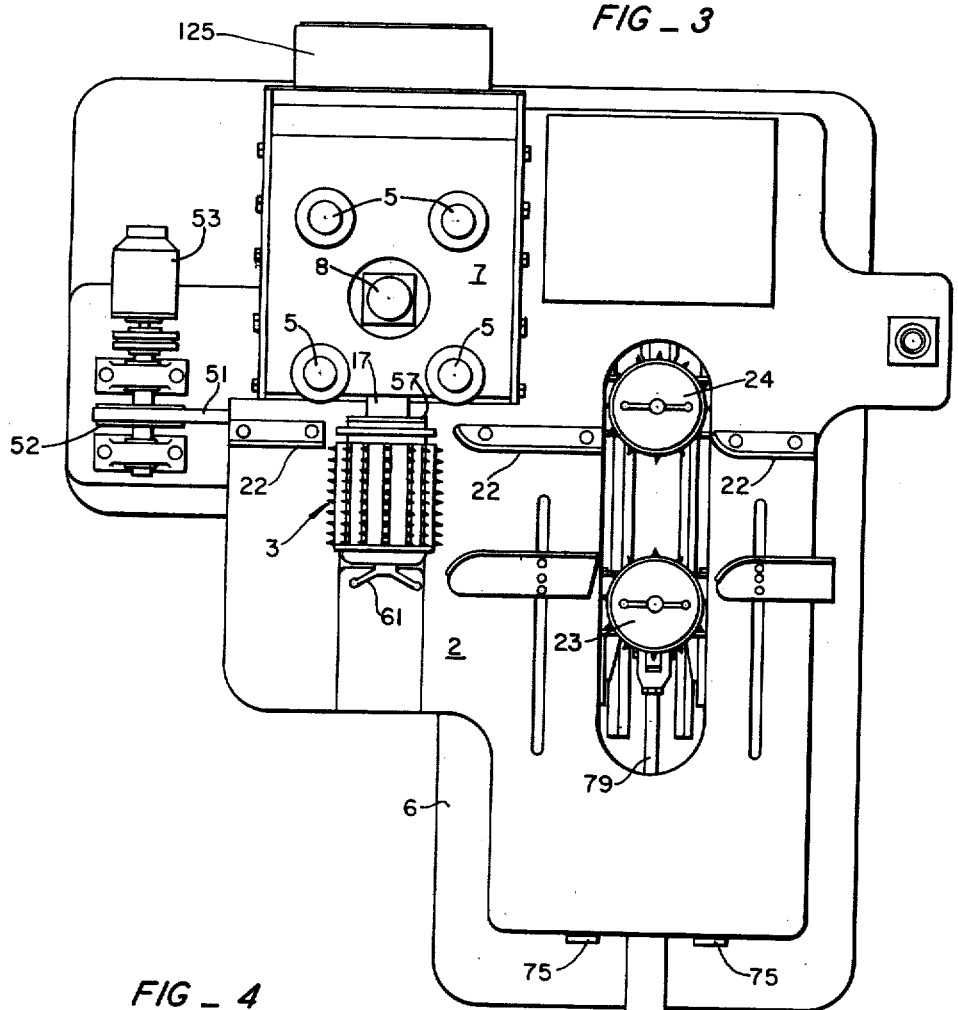
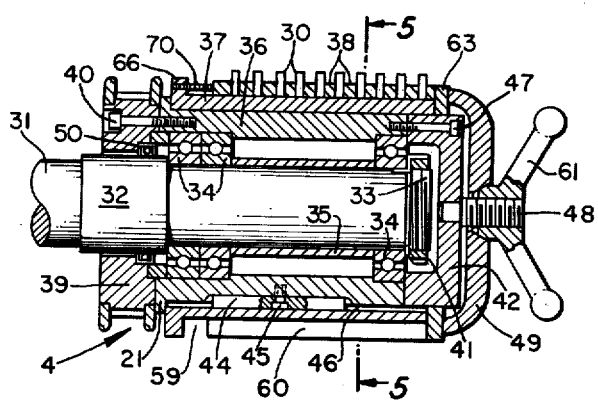
INVENTORS
CHARLES W. BEST
JOE T. NAPIER
BY
Boylen, Mohler + Wood
ATTORNEYS

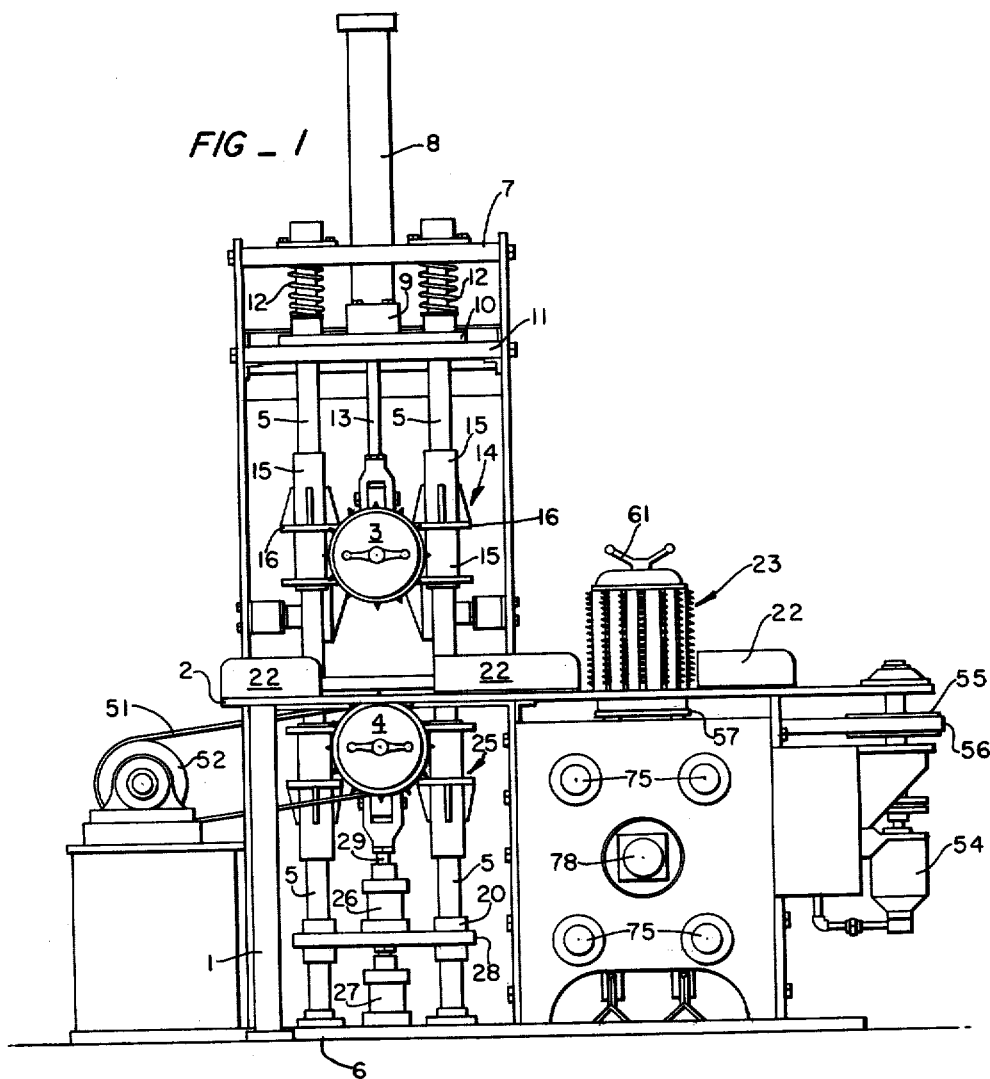

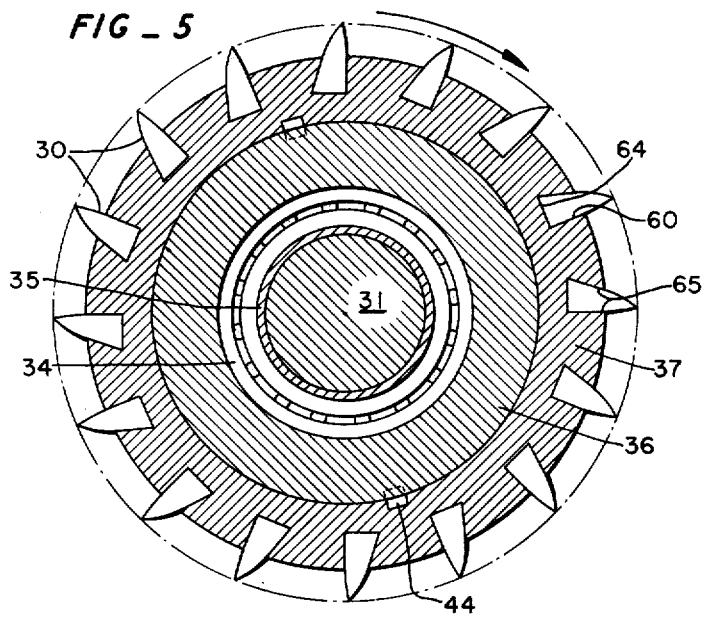
FIG_5
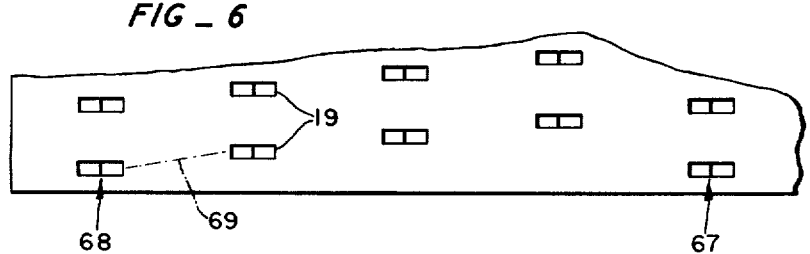
FIG_6
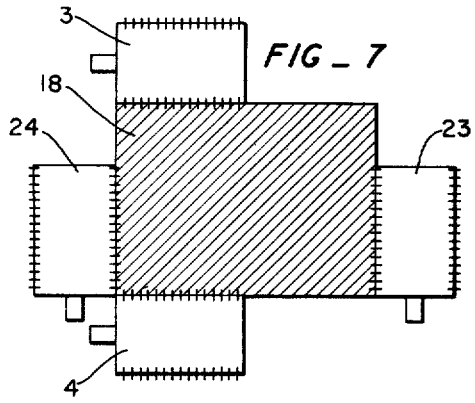
FIG_7
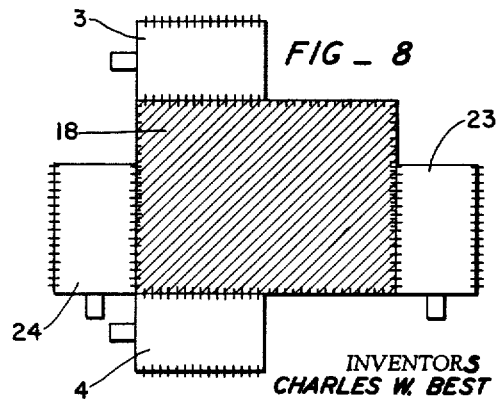
FIG_8
INVENTORS
CHARLES W. BEST
JOE T. NAPIER
BY
Boyken, Mohler + Wood
ATTORNEYS

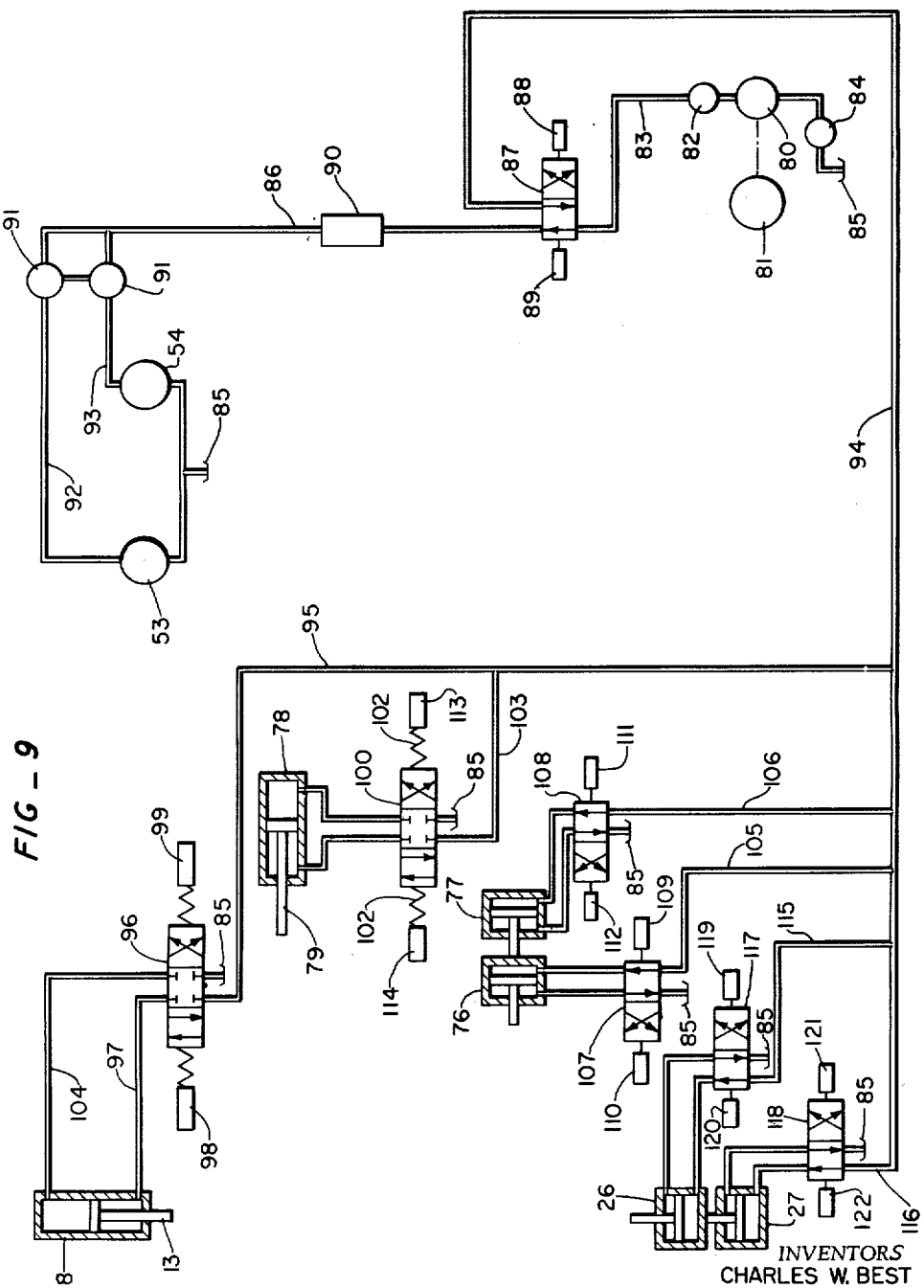

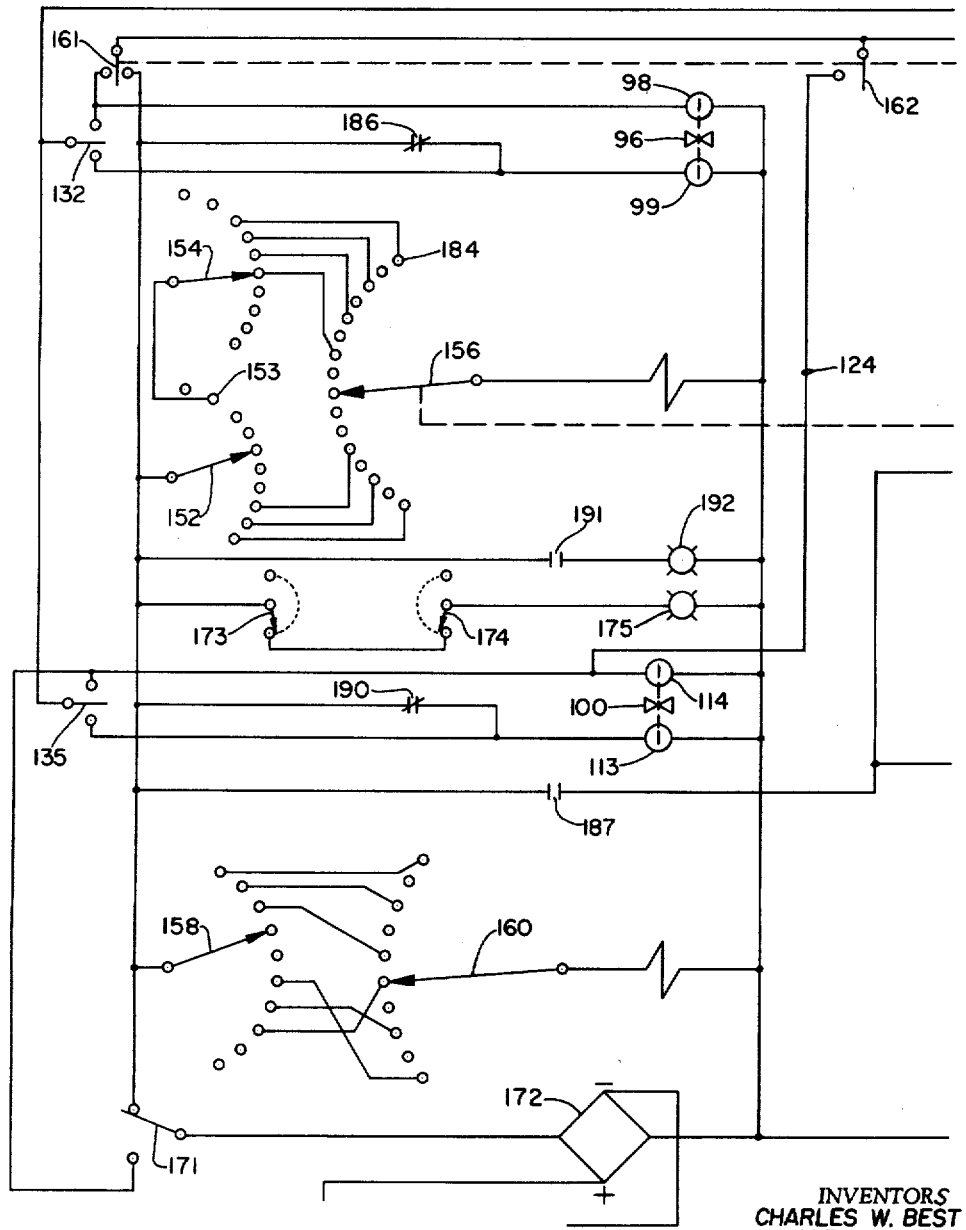
FIG_11A

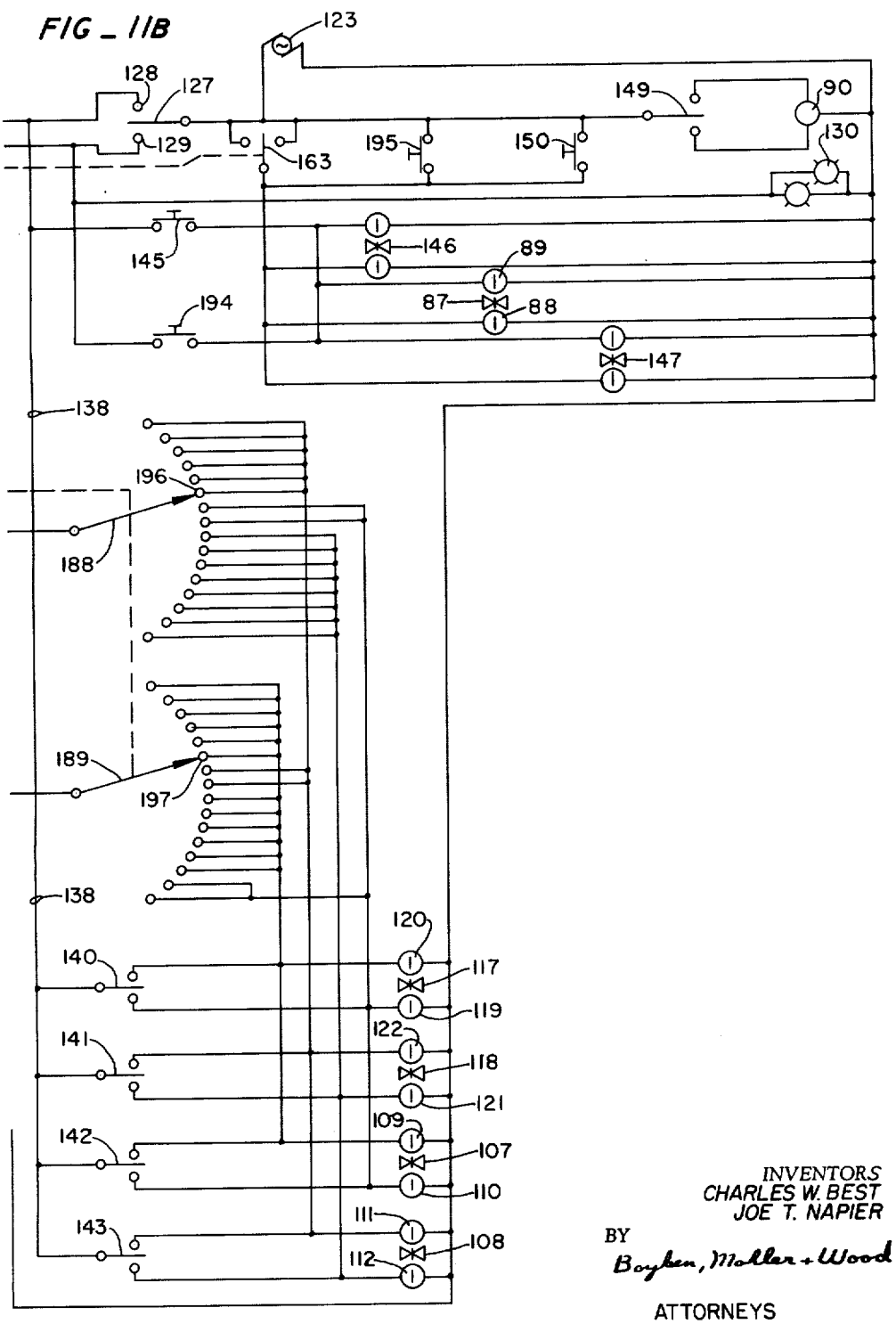

United States Patent Office 3,125,141
Patented Mar. 17, 1964

3,125,141
TIMBER INCISING APPARATUS
Charles W. Best and Joe T. Napier, Lafayette, Calif., assignors to J. H. Baxter & Co., San Francisco, Calif., a corporation
Filed Dec. 19, 1960, Ser. No. 76,608
12 Claims. (Cl. 144—2)

This invention relates to an improved apparatus for incising the horizontal and vertical faces of timbers of rectangular cross section.

Timbers which are to be used as pillings or poles resist rot much more effectively when treated with chemicals such as creosote or other preservative. This is especially true where the timber is subjected to moisture, as where pilings are used to support structures above water or where posts are placed in moist soil. Such treating with creosote or other preservative also effectively prevents the destruction of the timber by termites and the like.

It has been found that the effectiveness of the above mentioned treating process can be greatly enhanced by incising or making small indentations in the periphery of the timber thus providing a greater surface area into which the chemical may penetrate, which in turn effects a deeper penetration of the chemical into the timber. This increased penetration is obtained without increasing the surface area of the timber exposed to weather as the holes created will be filled with preservative after the treating process is completed.

After a log has been processed through a sawmill and become a beam or timber, the peripheral portions dry very rapidly creating internal stresses which often crack or check the beam making it useless for many purposes. The incising process of this invention leaves diagonal rows of indentations which tend to confine splitting or checking to numerous small cracks which do not affect the strength of the timber but actually facilitate the penetration of the chemical preservative.

A primary object of this invention is the provision of improved apparatus for incising timbers of rectangular cross section, which apparatus will easily handle great varieties of sizes of timbers.

A related object of this invention is the provision of an incising apparatus for rectangularly shaped timbers in which an operator can easily set the controls therefor to correspond to the size of timber and select the desired depth of penetration.

Another object of this invention is the provision of apparatus having toothed incising drums which are readily accessible for easy removal or for disassembly to facilitate replacement of incisor teeth or rearrangement thereof.

Still another object of this invention is the provision of incising apparatus which can handle timbers of a width and thickness twice the length of the incisor drums by merely rotating the timber one hundred and eighty degrees and running it through the apparatus a second time.

A related object is the provision of incising apparatus capable of handling a wide range of timber sizes while keeping incisor teeth wear at a substantially uniform rate.

Other objects and advantages will become apparent from the following description and referring to the drawings, in which:

FIG. 1 is a side elevational view of the apparatus of this invention;

FIG. 2 is an end elevational view of the apparatus of FIG. 1;

FIG. 3 is a top plan view of the apparatus of FIG. 1;

FIG. 4 is an enlarged sectional view of an incisor drum of FIG. 1;

FIG. 5 is an enlarged vertical section of the incisor drum as seen from lines 5—5 of FIG. 4;

FIG. 6 is a plan view of a portion of a developed surface which has been incised by the roller of FIG. 4;

FIG. 7 is a schematic view of a section of a large timber and the related incising apparatus of this invention during a first run through the apparatus;

FIG. 8 is a schematic view similar to FIG. 7 of a second run of the timber through the apparatus;

FIG. 9 is a semischematic view of the hydraulic system of the apparatus of this invention;

FIG. 10 as a semischematic view of a timber size settling device and system of the apparatus; and, FIGS. 11A and 11B are schematic diagrams of the electrical control system of the apparatus.

In detail, as seen in FIG. 1, the apparatus of this invention comprises a frame 1 supporting a horizontally disposed table top 2 in a position elevated above the floor. Frame 1 also supports a first pair of incisor drums 3, 4 mounted for rotation about spaced horizontal axes respectively above and below table top 2 and a second pair of incisor drums 23, 24 mounted for rotation about spaced vertical axes respectively inwardly and outwardly of a vertically disposed fence 22. The drums of each pair are opposed and the ends of drums 3 and 4 are generally aligned with fence 22 whereas the lower ends of drums 23, 24 are generally aligned with table top 2. Drums 3 and 4 are hereinafter sometimes referred to as the horizontal drums and drums 23, 24 as the vertical drums, and the respective pairs of drums are adapted to sequentially receive between the drums thereof a timber to be incised. Such timber will be guided between the drums, in a manner to be described, by table 2 and fence 22.

Drums, 3, 4 are mounted for vertical movement along four vertical ways 5 which extend from a base 6 at the floor upwardly to a horizontally disposed spacing member 7. Both base 6 and member 7 are secured to frame 1.

Vertical movement of drum 3 is provided by a hydraulic cylinder 8 which is vertically disposed between ways 5 extending upwardly through member 7 and is secured at its lower end 9 to a plate 10 which in turn rests on a fixed horizontal member 11 secured to frame 1. Upward movement of plate 10 is yieldably resisted by coil springs 12 which are substantially concentric with ways 5 and extend between plate 10 and fixed spacing member 7.

The piston rod 13 of hydraulic cylinder 8 extends downwardly through an opening in horizontal member 11 and is connected to a carriage 14. This carriage comprises four elongated sleeve bearings 15 each slidable on ways 5 and connected together by a yoke 16. Rigidly fixed to yoke 16 is a shaft 17 (FIGS. 2 and 3) which is horizontally disposed and projects outwardly over and parallel with table top 2. Suitable bearing means rotatably support drum 3 on the outer free end of shaft 17 for free rotation thereon.

Drum 4 is mounted below table top 2 in a manner similar to drum 3. A carriage 25 (FIG. 1) similar to carriage 14 but reversed top for bottom is mounted for vertical sliding movement on ways 5. Such movement is provided by two short-stroke hydraulic cylinders 26, 27 which are interposed between and connected to carriage 25 and a horizontal member 28, which has vertically disposed sleeve bearings 20 at its corners for slidable engagement with ways 5, and between member 28 and base 6, respectively. Cylinder 27 is thereby connected at one end to base 6 and its piston rod is connected to horizontal member 28. Cylinder 26 has one end secured to member 28 and has its piston rod 29 attached to carriage 25.

Incising drum 4 is mounted for rotation on the outer free end of a shaft 31 (FIG. 4) which is secured at its inner end to carriage 25. Drum 4 is directly below and opposed to drum 3, they each having their axes in the same vertical plane and parallel to each other.

Drums 3 and 4 are of similar construction and similarly mounted on shafts 17, 31 which may be provided with collars 32 (FIG. 4) spaced inwardly from their threaded outer ends 33 a sufficient distance so that a portion of said collar extends inwardly of the drums 3, 4.

Each drum 3, 4 (FIG. 4) includes a tubular arbor 36 supported for rotation on the outer end of shaft 31 by inner and outer bearings 34. Said bearings are spaced by a tubular spacer 35 and by corresponding inwardly directed shoulders on arbor 36 which is also provided at its inner end (adjacent collar 32) with an outwardly directed flange 21. Bearings 34, spacer 35, and arbor 36 are held on shaft 31 (17) by a lock nut 41 threaded on end 33 of said shaft and with inner bearings 34 abutting collar 32. A bearing cap 42 of the same outside diameter as arbor 36 encloses the outer end 33 of shaft 31 and is secured to the outer end of arbor 36 by a plurality of cap screws 47. By this construction arbor 36 and cap 42 are supported on the outer free end of shaft 31 for free rotation thereon.

A cylindrical sleeve 37 is supported on arbor 36 for rotation therewith. Arbor 36 is provided with one or more keys 44, each held in an axial slot in said arbor by a cap screw 45, projecting outwardly and respectively received in axial, inwardly opening keyways 46 in shell 37. Shell 37 may be slipped on arbor 36 from the outer free end thereof with keys 44 engaged in keyways 46 so that the inner end of shell 37 abuts flange 21 on arbor 36.

Shell 37 is provided with a plurality of equally peripherally spaced, radially outwardly opening, axially elongated slots or channels 60 (FIGS. 4 and 5) which are wider at their bases 64 than at their openings 65 at the periphery of said shell. An outwardly opening circumferential groove 59 (FIG. 4) of substantially the same depth as channels 60 is provided near the inner end of shell 37 adjacent endwall or flange 66 thereof. Channels 60 open outwardly at the outer end of shell 37 and into groove 59 at the inner end of said shell, and each receives a plurality of incisor teeth 30 alternating with spacers 38. Both spacers 38 and teeth 30 are provided with wider bases fitting the dovetail shape of channels 60 and the outer ends of spacers 38 are generally flush with the periphery of shell 37, whereas teeth 30 project outwardly therefrom. The outer ends of teeth 30 are pointed or sharpened so as to form an elongated cut in a timber when impressed therein.

A plurality of set screws 70 are threaded through endwall 66 of sleeve 37 and project across groove 59 to the inner end of each channel 60. The plurality of alternate teeth 30 and spacers 38 in each channel 60 abut a set screw 70 at the inner end of the channel and a backing ring 63, having the same inside and outside diameters as shell 37, is slipped over bearing cap 42 and closes the outer ends of channels 60. The assembly of shell 37 with its incising teeth 30 and backing ring 63 is held in place on arbor 36 against flange 21 by a shell hub 49 which extends over the outer free end of cap 42 and is provided with an inwardly directed flange engaging ring 63. A threaded stud 48 secured to cap 42 projects through a central opening in hub 49 and a speed nut 61 threaded thereon and engaging hub 49 serves to securely lock the incisor shell assembly on arbor 36.

It will be noted that the shell 37 may be readily removed from arbor 36 by sliding it outwardly off the outer free end of said arbor by merely unscrewing speed nut 61 and removing hub 49 and ring 63. In a similar manner the incising teeth 30 of any of the rows in channels 60 may be removed by sliding the same from the open outer ends of said channels. Drums 23, 24 are of the same construction as drums 3, 4. Since the outer ends of each of the incising drums 3, 4, 23, 24 are free and unrestricted such changing of incisor shells or teeth may be accomplished without any substantial dismantling of the associated apparatus.

As an alternative to the above construction incisor teeth 30 may be integrally formed on a plurality of rims each having an inside diameter corresponding to shell 37 and a thickness of a tooth. Said rims may be received on arbor 36 (and keyed thereto) alternately with plain spacer rings having an outside diameter corresponding to the outside diameter of shell 37. Such rims appear substantially similar in appearance to the cross section of shell 37 in FIG. 5, and may be used with or without spacer rings to provide a substantial variety of incising patterns which may be as readily changed.

Of each of the pairs of incising drums one of the drums, 3 or 23 is movable to a substantially greater distance than the other drum 4 or 24. Therefore, the former are known generally as the movable drums and the latter as the fixed drums. In the case of both the horizontal and vertical pairs of drums the fixed drum of each pair is driven and the movable drum is freely rotatable. The only substantial difference in structure between the movable and fixed drums is that the latter, 4 or 24 (FIG. 4) is provided with a drive pulley 39 secured to the inner end of arbor 36 by a plurality of capscrews 40. Pully 39 carries an inwardly directed annular seal 50 in engagement with the periphery of collar 32 on shaft 31. Said pulley is connected by belt 51 (FIGS. 1, 3) to a pulley 52 coupled to a motor 53 for driving the same. A similar motor 54 (FIGS. 1, 2) is coupled by its driven pulley 55 and belt 56 to the driven pulley 39 secured to incising drum 24 in the same manner as described for drum 4.

In place of pulley 39, drums 3 and 23 may be provided with a seal retainer 57 for holding seal 50 in place (FIGS. 1, 3).

The drives of motors 53, 54 are synchronized to the same speed, as will be later explained, so that drums 4, 24 will urge the timbers to be incised between the pairs of drums by engagement of the incising teeth 30 on the driving drum with the surfaces of the timber.

Means for supporting vertical incising drums 23, 24 for movement horizontally toward and away from fences 22 are provided by substantially the same structure as described for the vertical movement of horizontal drums 3 and 4. Drum 23 is supported on a carriage identical with carriage 14 and slidable on horizontal ways 75 (FIG. 1) identical with vertical ways 5. Similarly, drum 24 is supported on a carriage identical with carriage 25 slidably supported on horizontal ways 75. For movement of drum 23 toward and away from fences 22 a long stroke hydraulic cylinder 78, secured to frame 1, is provided with its piston rod 79 (FIG. 3) connected to the carriage for drum 23. A pair of short stroke hydraulic cylinders similar to cylinders 26, 27 are similarly connected in series to the carriage for incising drum 24 for moving said drum to effect the amount of projection of the teeth 30 thereon outwardly of fences 22.

The hydraulic cylinders 8, 78 move the movable drums 3, 23 toward and away from their corresponding fixed drums 4, 24, respectively to effect the proper spacing between the drums of each pair corresponding to the thickness and width of the timber to be incised. The range of movement of drum 3 from table 2 is substantially twice the axial length of the vertical drums 23, 24. Similarly, the range of movement of drum 23 from fences 22 is substantially twice the axial length of horizontal drums 3, 4. Since the space between the drums of each pair and the space extending outwardly of the free ends thereof is unobstructed by bearings, supports or other structure, timbers of a width and/or thickness substantially greater than the length of the horizontal or vertical drums may be incised on the apparatus of this invention.

FIGS. 7 and 8 illustrate diagrammatically the incising of a timber having a rectangular cross section of, for example, 18 by 24 inches in the apparatus wherein the length of the incising drums is 12 inches. By operation of hydraulic cylinder 8 the spacing between drums 3 and 4 is set at approximately 18 inches and cylinder 78 is operated to create a spacing between drums 23, 24 of approximately 24 inches. Such setting of the spacing between the drums also takes into account the desired depth of penetration of the incising teeth 30 into the timber, as will be explained in greater detail. In the example of FIGS. 7, 8, FIG. 7 illustrates the first pass or run of the timber 18 between the sets of incising drums and indicates that approximately half of the horizontal surfaces and ⅔ of the vertical surfaces of the timber will be incised during such pass.

The timber is then reversed top for bottom and passed between the incising drums for a second time as illustrated in FIG. 8. This second pass incises the remaining surfaces on the timber in a manner similar to the partial incising of the first pass. In this manner substantial versatility is gained by doubling the ostensible range of the timbers which can be incised by the apparatus of this invention.

The two short stroke cylinders 26, 27 which are connected to drum 4 (and correspondingly drum 24) regulate the amount which teeth 30 on each said fixed drum project above the table top 2 (or outwardly of fixed fences 22). These cylinders are adapted to operate in only the two extreme positions, that is with the piston rod fully extended or fully withdrawn. The stroke of cylinders 26, 27 is thereby related to the amount which each tooth 30 projects above the periphery of shell 37.

In one example of the apparatus of this invention, teeth 30 project ¾ inch above the periphery of the incising drum which, of course, is the maximum depth of penetration of the incising teeth into the timber being incised. This depth has been found satisfactory for larger timbers up to 12 by 24 inches in cross section. In smaller timbers, however, it is not desired to incise to such a depth and, therefore, this apparatus provides the adjustment features of cylinders 26 and 27.

In the specific example set forth above the minimum desired depth of penetration (and therefore projection of teeth 30 on drum 4 above table 2 and on drum 24 outwardly of fences 22) is 3/16 inch. Cylinder 27 has a stroke of ⅜ inch and cylinder 26 a maximum stroke of 3/16 inch. With both cylinders retracted the projection of the teeth of drums 4 and 24 will be at the minimum of 3/16 inch. With cylinder 27 extended the teeth will project 9/16 inch; with only cylinder 26 extended the projection will be ⅜ inch; and with both cylinders extended the projection of the teeth on drums 4 and 24 will be ¾ inch upwardly from table top 2 and outwardly from fences 22, respectively.

Since the timber to be incised rides on table top 2 and along fences 22 the above setting will determine the depth of penetration of the teeth on drums 4 and 24. The depth of penetration of the teeth on the opposing drums 3 and 23 is set the same by taking it into account in positioning drums 3 and 23 for thickness and width with cylinders 8 and 78, respectively.

Since one of the purposes of incising timbers is to resist the tendency of drying wood to develop elongated surface cracks and checks, it has been found advisable to arrange the incising teeth 30 on each incising drum in a pattern other than straight circumferential rings. One practical pattern is illustrated in FIG. 6 as it might appear on the surface of a timber that had been incised with the apparatus of this invention. The cuts 19 made by the teeth 30 are offset in each succeeding row. This is accomplished by providing spacers 38 of varying widths at the ends of each of the channels 60 in the shell 37. For example, in the first row 68 of a series the spacer 38 at the outer end of shell 37 is relatively short and the intermediate spacers between the teeth are larger and of the same width. In succeeding rows the end spacer is increased in size for perhaps three rows. The end spacer on the fifth row 67 may be substantially the same as the end spacer on row 68 thereby providing a repetitive pattern around the periphery of the drum. Each of the teeth 30 is thereby axially spaced from its adjacent teeth, preferably by substantially a whole multiple of the tooth width and the teeth in each row are offset axially from the teeth in the adjacent rows by some fraction of the spacing, preferably substantially the width of a tooth. With teeth approximately ¼ inch wide and at an axial spacing of approximately ¾ inch, offsetting the teeth of each succeeding row approximately ¼ inch will produce a pattern such as illustrated in FIG. 6 which repeats itself each fifth row.

Spacing the teeth in this manner to produce the incising pattern of FIG. 6 helps prevent the development of long deep cracks or splits in the incised timbers by encouraging numerous short diagonal checks, as indicated at 69, which tend to localize the stress relief in the drying timber. The staggered cuts 19 produced by the offset incisor teeth also tend to stagger the surface checks that develop in the timber and aid in the seasoning process without severely affecting the strength of the timber.

In the event a closer incising pattern is desired (especially with less penetration on smaller timbers) in which the rows of incisions abut or overlap, the modification wherein the teeth are integrally formed on rims is useful. Using such rims a staggered offset pattern may be assembled with rims having teeth formed at peripheral intervals of several rows and with adjacent rims shifted circumferentially so that no two teeth are adjacent. Ring spacers may or may not be used with such rims depending upon the closeness of the pattern desired. One of several staggered yet close incising patterns on smaller timbers will inhibit the development of long checks and thereby keep the timber from being weakened during the drying process.

The motive power for the operation of the apparatus heretofore described is preferably provided by an hydraulic system illustrated schematically in FIG. 9. Such hydraulic system includes a main hydraulic supply pump 80 driven by an electric motor 81 and supplying high pressure hydraulic fluid through a check valve 82 to a main supply conduit 83. Pump 80 draws the fluid through a filter 84 from a reservoir of such fluid. The symbol 85 appearing in various places on FIG. 9 indicates the reservoir to which the spent hydraulic fluid returns.

Preferably the drive for incising drums 4, 24 is provided by hydraulic motors 53, 54 which are supplied with hydraulic fluid through a branch conduit 86 from main conduit 83. Interposed in line or conduit 86 is an on-off valve 87, which may be operated by solenoid actuators 88, 89 and a conventional flow device 90 for controlling the speed of motors 53, 54. In order to maintain motors 53, 54 at the same speed a pair of metering motors 91 are interposed in their input conduits 92, 93, said metering motors being directly coupled to each other for running together and thereby metering the same hydraulic flow to both incisor drum motors 53, 54. It may be noted that the same drive may be provided for both fixed drums of each pair or that only a single drum of one of the pairs may be driven, but it has been found advisable to drive the incisor drums as described herein.

Another branch conduit 94 from main pressure conduit 83 supplies the hydraulic cylinders which move the incising drums to effect the spacing therebetween. A branch conduit 95 leads from conduit 94 through a control valve 96 to supply the input conduit 97 to one side of the vertically arranged cylinder 8 connected to horizontal incising drum. A return conduit 104 from the other side of the piston of cylinder 8 returns through valve 96 to reservoir 85.

Cylinder 8 is a double acting hydraulic cylinder and valve 96 is of the type in which there is no hydraulic flow to cylinder 8 (with valve 96 in the central, inoperative position shown in FIG. 9) or in which high pressure fluid is circulated by valve 96 to one side of the piston of cylinder 8 or the other, respectively (when the control element of valve 96 is shifted to the right or left by solenoid actuators 98, 99). The arrows in the compartments of the body of valve 96 indicate schematically the direction of hydraulic fluid flow when the valve has been actuated to one or the other of its operative positions.

As previously described, the operation of long stroke cylinder 8 determines the distance between horizontal incisor drums 3, 4 to accommodate timbers of various thicknesses. The operation of cylinder 8 on drum carriage 14 also sets the depth of incision of teeth 30 of drum 3.

Another branch conduit 103 leads from conduit 95 through a control valve 100 to supply the pressure required to operate cylinder 78 in a manner similar to that of cylinder 8. Control valve 100 is substantially the same as valve 96 and may be actuated by solenoids 113, 114. As with control valve 96, when solenoids 113, 114 of valve 100 are not actuated, the valve is returned to the neutral position shown in FIG. 9 by springs 102.

The operation of cylinder 78 on the carriage of vertical drum 23 serves to adjust the distance between vertical drums 23, 24 to accommodate timbers of various widths. The operation of long stroke cylinder 78 also sets the depth of incision of teeth 30 of drum 23.

Branching from conduit 94 are a pair of conduits 115, 116 which lead through double-acting control valves 117, 118, respectively, to short stroke cylinders 26, 27, respectively, which are connected in series to the carriage of drum 4 and are intended to operate only at the extremes with their respective piston rods either completely extended or completely retracted. Valves 117, 118 are preferably actuated by solenoids 119, 120, 121, 122, and have no neutral position, as do valves 96 and 100, since cylinders 26, 27 are never locked in an intermediate position. Cylinders 26, 27 have a predetermined fixed stroke length and are operated independently of each other although they may be operated simultaneously to effect a combined result, as previously described.

It should be noted that the depth of incision is preferably related to the thickness dimension of the timber. Since the solenoids of valves 117 and 107 are connected in series (FIG. 11B), as are the solenoids of valves 118 and 108, only the switches 140 and 141 need be manipulated to effect corresponding movements of valves 117, 118, 107 and 108.

Cylinder 26 is extended by the actuation of solenoid 120 and retracted by the actuation of solenoid 119. Likewise, cylinder 27 is extended by actuating solenoid 122 and retracted when solenoid 121 is energized (FIG. 11B).

Also leading from conduit 94 (FIG. 9) are branch conduits 105, 106 which supply the hydraulic pressure to operate cylinders 76, 77, respectively, through control valves 107, 108, respectively.

Short stroke cylinders 76, 77, and valves 105, 106 are similar to cylinders 26, 27 and valves 117, 118 in both form and function except cylinders 76, 77 are connected to the carriage of drum 24 to set the incision depth thereof. The valves are preferably solenoid actuated. The actuation of solenoid 109 operates to extend cylinder 76, whereas the actuation of solenoid 110 reverses the flow of fluid and retracts the piston rod of said cylinder. Actuation of solenoid 111 operates to extend cylinder 77, whereas actuation of solenoid 112 retracts said cylinder.

Cylinder 77 has a ⅜ inch stroke and cylinder 76 has a ³⁄₁₆ inch stroke, and the operation and purpose of cylinders 76, 77 is similar to that of cylinders 26, 27.

The return fluid lines on each of valves 96, 100, 107, 108, 117 and 118 (FIG. 9) carry the expended fluid back to the hydraulic fluid reservoir indicated by symbols 85.

The timber incising mechanism herein described can be operated from a control panel 125 attached to frame 1 (FIGS. 2, 3). Operation may also be controlled from a remote unit which may be conveniently located near the end of a conveyor on which the timbers to be incised are loaded. Setting of the width, thickness, and incising depth requirements of the apparatus may be accomplished manually or automatically. With a remote control panel, the proper information concerning the thickness and width of the timber may be relayed to the incising mechanism while the particular timber is approaching the first set of incisor drums. The timber incisor will then be properly set to accept the timber when it reaches the first set of drums.

The electrical control circuit, shown in FIGS. 11A and 11B, may be supplied with alternating current, either through a transformer or directly, as indicated at 123 (FIG. 11B). In the manual setting operation, assuming that electric motor 81 and hydraulic pump 80 of FIG. 9 are in operation, the operator would first move two point selector switch 127 (FIG. 11B) to the upper contact 128 which closes the circuit required for manual operation of the timber incisor.

Next, switch 132 (FIG. 11A) would be moved to the upper or lower contact depending upon whether the distance between the horizontal drums is to be increased or decreased. By moving switch 132 to the lower contact, solenoid 99 (FIGS. 9, 11A) is actuated which moves valve 96 from the neutral position to an extreme left position in which the fluid from conduit 95 is routed through conduit 104 to extend cylinder 8 and decrease the distance between horizontal drums 3, 4.

The opposite would obviously be true if switch 132 were moved to the upper contact. When the switch is on neither contact, as seen in FIG. 11A, valve 96 (FIG. 9) is spring-returned to a neutral position.

By manipulation of switch 135 in a manner similar to that of switch 132 it is possible to set the distance between vertical drums 23, 24. By positioning switch 135 at the lower contact solenoid 113 is actuated which operates to extend cylinder 78 (FIG. 9) and decrease the distance between the vertical drums. Opposite movement is accomplished when the switch 135 is positioned on the upper contact actuating solenoid 114.

In order to complete preparation for manual operation of the timber incisor, the depth of incision of teeth 30 which is desirable for the timber to be incised must be set. Short stroke cylinders 26, 27, 76, 77 are connected to the manual circuit by wire 138 (FIG. 11B). Positioning of switches 140, 141, 142 and 143 at their upper contacts actuates solenoids 120, 122, 109 and 111 respectively to extend all short stroke cylinders. The opposite is true when each of said switches is positioned on the lower contacts actuating solenoids 119, 121, 110 and 112 respectively. As previously described, the short stroke cylinders are set only at their extremes and any combination of extended and retracted cylinders can be resorted to in order to produce the most desirable depth of incision for the timber to be incised.

After all hydraulic cylinders have been properly set, manual start switch 145 is depressed, starting a pair of conveyor motors 146, 147 which are not pertinent to the operation of the timber incisor. Upon depressing start button 145, solenoid 89 is also actuated which positions control valve 87 to run hydraulic motors 53, 54 as seen in FIGS. 9 and 11B.

To complete the manual operation, the speed of motors 53 and 54 must be set for fast or slow incision depending upon the size and type of timber. Positioned on its upper contact, switch 149 (FIG. 11B) sets speed control motor 90 (FIGS. 9, 11B) for fast operation while the lower contact is for slower operation. With this adjustment complete the timber incisor is now ready to be fed the particular timber or timbers for which it has been set.

When the timbers for which the machine has been set have been incised, the hydraulic motors 53, 54 which run the driving incisor drums 4, 24 are stopped by making contact at switch 150. This energizes solenoid 88 which operates to position valve 87 of FIG. 9 in the extreme right position which stops the flow of hydraulic fluid to motors 53, 54.

Manual operation can be a time consuming operation. For this reason an automatic system of operation, which will later be described, has been devised for timbers of the more common dimensions. Thus the lengthy process of manual operation is primarily used for timbers of irregular dimensions and timbers larger than the maximum economic capacity of the automatic system.

As above noted, the automatic control system of this machine is limited to timbers of certain common and regular sizes although it is to be understood that the system can be adjusted to accommodate timbers of any dimension within the physical capacity of the apparatus.

In automatic operation, assuming again that electric motor 81 and hydraulic pump 80 of FIG. 9 are in operation, the first step is to position selector switch 127 (FIG. 11B) at its lower contact 129 which closes the circuit for automatic or remote operation.

When switch 127 makes connection with contact 129 this closes the circuit to signal light 130 which indicates that the machine is ready to be set-up for automatic operation. Two lights 130 are indicated in FIG. 11B, one of which may be located in the remote panel and the other at control cabinet 125 on frame 1.

Next a series of selector switches must be set for the required thickness and width of timber, taking into account whether the timber is rough or has been surface planed or finished. For finished timber, selector switch 152 (FIG. 11A) is set to a contact which corresponds to the thickness in finished dimension of the timber to be incised. If the timber is rough surfaced, selector switch 152 is set on contact 153 in order to complete a circuit with rough surface selector switch 154. Then switch 154 is set on a contact which corresponds to the thickness in rough dimension of the timber to be incised.

Both switches 152 and 154 have a number of contacts, each of which corresponds to a popular or common thickness of timber either finished or rough. Each such contact is connected with a complementary contact in a multi-wafer stepping relay 156, the function of which will later be described. A few such connections are illustrated in FIG. 11A.

The next step in automatic operation is to set selector switch 158 to the desired width of timber, rough or finished. In the preferred form of the invention, the vertical drums are so adjusted that they can incise a minimum width of timber of four inches, rough or finished. However, it should be noted that the distance between the horizontal drums can be closed enough to incise a timber one inch in thickness, rough or finished dimension. Therefore, the range of automatic operation of the vertical drums is not as great as that of the horizontal drums and it will be noted that switch 158 has fewer contacts than the combined number of contacts of switches 152 and 154. Due to the narrower range of operation, both rough and finished width dimensions can be handled on switch 158.

The contacts of switch 158 also correspond to popular or common widths of timber and said contacts are connected with complementary contacts in stepping relay 160, the function of which will later be described.

The next step in automatic operation is to move set switch 161 to either the left or the right contact as seen in FIG. 11A. If the timber to be incised is of a smaller dimension than the last setting of the machine, set switch 161 can be moved to the right contact which immediately causes the distance between the horizontal and verical drums to be decreased by energizing solenoids 99 and 113, respectively, which operate to extend long stroke cylinders 8 and 78, respectively. Movement of said cylinders will automatically stop when they reach the proper position, as will later be described in the full operation of resetting the machine.

Mechanically connected with set switches 161, 162 (FIG. 11A) is a stop switch 163 (FIG. 11B) which actuates solenoid 88 to move valve 87 to a position to stop incisor drum motors 53, 54 (FIG. 9) while the drums are being positioned. This is for safety reasons as well as economy of operation.

The basic operation of the stepping relays 156, 160 will be described in connection with the full cycle of operation for timbers of dimensions larger than the last setting on the machine. When such timbers are to be incised, long stroke cylinders 8, 78 (FIG. 9) must be completely retracted so that the distance between the horizontal drums 3, 4 and vertical drums 23, 24 is at a maximum because the stepping relays 156, 160 operate in only one direction.

If such should be the case, the set switch 161 would be positioned on the left-hand contact as seen in FIG. 11A in which position it would close the circuit to energize solenoid 98 which actuates valve 96 to retract cylinder 8. At the same time switch 162, mechanically connected with switch 161, closes the circuit 124 to actuate solenoid 114 of valve 100 to retract cylinder 78. Switch 163 operates as described above to stop motors 53, 54 and rotation of drums 4, 24 should they be running.

Switch 161 must be held in the closed position until the long stroke cylinders 8, 78 are completely retracted. Said switch is spring urged to an "off" position in which all circuits it affects are open.

As the carriage 16 of drum 3 (FIG. 1) is moving upwardly along ways 5 and cylinder 8 is retracting, a microswitch 165 (FIG. 10) is mechanically closed by the carriage reaching the top to energize the circuit for a pair of notch homing wafers 167 and 168. Said homing wafers are interconnected in stepping relays 156, 160 and function to return each stepping relay to its starting position or the extreme position of greatest timber dimension. When the stepping relays each reach said position, a pair of current strength "break" type contractors 169, 170 break the circuits to homing wafers 167, 168, respectively, to stop movement of the stepping relays.

Also incorporated in stepping relays 156 and 160 are another pair of wafers 173, 174, respectively (FIG. 11A), which are synchronized with wafers 167 and 168 of FIG. 10 but connected in the main alternating current circuit. Thus, when each of stepping relays 156, 160 homes to the top, wafers 173, 174 (connected in series) close the circuit to a light 175 which indicates that the drums are ready to move together to the correct timber dimensions.

In explanation of FIG. 10, this diagram is set apart from the main wiring diagrams of FIGS. 11A and 11B because it is operated on a separate direct current source which is supplied by connection across rectifier 172 of FIG. 11A. Current to rectifier 172 and to the control system of FIG. 10 is not needed when the apparatus of this invention is operated manually. Therefore, switch 171 can be manipulated to eliminate rectifier 172 from the circuit in which it is not used.

With switches 152, 154 and 158 at their proper settings for thickness and width, and light 175 on, the incisor drums 3, 23 are ready to move toward drums 4, 24 respectively to the preset dimensions of the timber to be incised. Switch 161 is then moved from the left contact to the right-hand contact as seen in FIG. 11A. This closes the circuit to energize solenoids 99 and 113 which operate valves 96 and 100 to extend long stroke cylinders 8 and 78 respectively. As said cylinders extend they move the carriages of the driven drums 3, 23 toward the driving drums 4, 24.

Rigidly secured to each carriage for movement therewith are a pair of slide bars similar to bar 177 of FIG. 10. Said slide bars are adapted to be engaged along their outer edges 178 by the actuating arm of a microswitch 180 which is rigidly secured to frame 1. Side edge 178 of bar 177 is so formed that it has notches at predetermined intervals which correspond to the various thickness dimensions, rough or finished, which the machine is capable of handling automatically. As bar 177 progresses with carriage 16 on its downward path, the notched edge 178 engages the arm of stationary microswitch 180 causing alternate closing and opening of such switch.

Assuming that microswitch 180 is open when the arm is in the spring-urged outer position, engagement of said arm by the raised portions of edge 178 closes said switch. When said switch is closed it energizes the ratchet relay of stepping relay 156 which causes said relay to move one step or one contact point toward a thinner dimension. There are two slide bars similar to 177 and two microswitches 180 and 181 which control stepping relay 156 of horizontal drum 3. Likewise a pair of bars (not shown) and a pair of microswitches 182, 183 control stepping relay 160 of vertical drum 23. One bar and switch combination is for rough dimension timber and the other bar and switch of each set of drums is for finished dimension timber.

Assuming that slide bar 177 of FIG. 10 is the rough dimension bar of the horizontal drum 3, the notches in said bar are so spaced to correspond to the rough dimensions of common sized timber. Thus when the switch 180 closes for the first time the impulse is given to stepping relay 156 to move to the first contact 184 which may correspond to a 12" rough dimensioned timber. The next step of relay 156 would be controlled by the finished dimension bar on carriage 16 of drum 3. This would cause relay 156 to move one more step to the next contact when switch 181 is closed, which contact may correspond to a 12 inch finished dimension timber.

Stepping relay 156 continues to step down in this manner each time switch 180 or 181 is opened and closed again until it reaches the contact that is in wired connection with the contact on selector switch 152 or 154 which corresponds to the thickness of the timber that is to be incised. When such contact is made, a circuit is closed between selector switch 152 or 154 and stepping relay 156, which increased load in the circuit causes a change in the current strength throughout the rest of the wiring system.

This change in the current affects a number of current strength "make" or "break" contactors. First a current strength "break" contactor 186 (FIG. 11A) is opened which cuts off the current to solenoid 99 of control valve 96. When solenoid 99 is no longer actuated, valve 96 (FIG. 9) is spring returned to a neutral position in which hydraulic cylinder 8 is locked in position. Carriage 16 of drum 3 stops movement and drum 3 is in the proper position to accommodate the thickness of the timber to be incised.

The change in current strength also actuates a "make" contactor 187 which closes the circuit to another pair of wafers 188, 189 (FIG. 11B) in stepping relay 156. As previously described, the depth of incision of teeth 30 on the incisor drums will vary with the thickness of the timber to be incised and the depth of incision is controlled by short stroke cylinders 26, 27, 76 and 77 (FIG. 9). Wafers 188, 189 are mechanically connected with stepping relay 156 and as said relay takes a step, said wafers also step to a contact corresponding to the correct depth of incision related to that particular thickness. When relay 156 reaches the correct contact corresponding to the thickness of the timber to be incised and stops, wafers 188, 189 also stop at the correct corresponding depth of incision contacts. Thus, when the change in current strength causes "make" contactor 187 to close, the circuit is closed which supplies current to the solenoid actuated valves of the short stroke cylinders 26, 27 76 and 77.

As seen in FIG. 11B, each contact of wafers 188, 189 is wired to the solenoids of the short stroke cylinders. When "make" contactor 187 is closed, the circuit is closed through the contacts at which wafers 188, 189 have stopped to the solenoids wired to that contact.

For example, assume that contacts 196, 197, at which wafers 188, 189 respectively rest, represent a timber that is eight inches in thickness. The desirable depth of incision for a timber of such thickness may be ¾ of an inch. As previously described, in order to effect a ¾ inch depth of incision, all short stroke cylinders must be fully extended. Thus, contact 196 would be connected to solenoids 122 and 111 of valves 118 and 108 respectively, and when said solenoids are energized by the closing of "make" contactor 187 short stroke cylinders 27 and 77 would be fully extended. Likewise, contact 197 is similarly connected to solenoids 120, 109 of valves 117, 107, respectively, to fully extend cylinders 26, 76 when energized. The proper solenoid will be energized to extend or retract the short stroke cylinders depending on which contacts wafers 188, 189 are resting upon when contactor 187 is actuated.

While stepping relay 156 is going through the above-described process of stepping down to the correct contact, stepping relay 160 is going through a similar process to close the distance between the vertical drums to the correct timber width which is set on selector switch 158. When relay 160 reaches the correct contact, it actuates "break" contactor 190 to de-energize solenoid 113 and stop the movement of long stroke cylinder 78 (FIG. 9).

The above-described operations of the stepping relays 156 and 160 occur simultaneously while switch 161 is being held against the right-hand contact as seen in FIG. 11A. When stepping relay 156 reaches the proper contact to complete a circuit, another current strength "make" type contactor 191 is actuated completing a circuit to a signal light 192 indicating that the machine is ready for the timber.

With the machine set up and ready for the timber as indicated by light 192, switch 161 is released and spring returned to a neutral position. This also returns switch 163 to a neutral position.

At this time push button switch 194 (FIG. 11B) is depressed which starts the aforementioned input and output conveyors 146, 147, and actuates valve 87 to start hydraulic motors 53 and 54 of incisor drums 4 and 24 respectively and to cut off hydraulic pressure to the various cylinders as seen in FIG. 9.

The only remaining operation is to set the speed of rotation of motors 53, 54 by the previously described operation of switch 149 and speed control motor 90.

When the timbers for which the machine has been set have been incised, the machine may be stopped by depressing stop switch 195 which is on the remote control panel or by depressing switch 150 which is in main control panel 125 on frame 1. Either stop switch completes the circuit to energize the proper solenoid to stop movement of conveyor motors 146, 147, and also closes the circuit to solenoid 88 of valve 87 which stops the flow of fluid to motors 53, 54 (FIGS. 9, 11B).

The above detailed description pertains to the construction and operation of the preferred form of the present invention. It is not intended to limit the scope of said invention as modifications may be apparent to one skilled in the art without departing from the spirit and scope of the appended claims.

We claim:

1. Apparatus for incising rectangular cross-section timbers, comprising: a pair of opposed horizontal incising drums and a pair of opposed vertical incising drums, the drums of each said pair being cylindrical, spaced and mutually parallel for respectively incising the horizontal and vertical faces of a timber passing therebetween, a carriage rotatably supporting one of the drums of each said pair from one end thereof with the other, free end of said one drum extending outwardly away from said carriage, means mounting each said carriage for movement with its respective one drum transversely of the axis of said one drum for increasing and decreasing the spacing between the drums of each said pair to correspond to the width and thickness of a timber to be incised, the other drum of each said pair being supported for rotation wtih its periphery generally aligned with said one end of the drums of the other said pair, and at least one of said carriages being mounted for such movement sufficient to increase said spacing to substantially twice the length of the drums of the other pair.

2. Apparatus for incising rectangular cross-section timbers, comprising: a main frame, a horizontal pair and a vertical pair of cylindrical opposed, spaced incising drums, each said drum having an outer peripheral shell carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, and power means for so moving said second and fourth carriage means to a spacing between said other drums and said table and fence, respectively, of substantially twice the length of the said rows of teeth on said one drums projecting respectively upwardly from said table and outwardly of said fence.

3. Apparatus for incising rectangular cross section timbers, comprising: a main frame, a horizontal pair and a vertical pair of cylindrical opposed, spaced incising drums, each said drum having an outer peripheral shell carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, and power means for so moving said second and fourth carriage means to a spacing between said other drums and said table and fence, respectively, of substantially twice the length of the said rows of teeth on said one drums projecting respectively upwardly from said table and outwardly of said fence, said shell and said teeth being axially removable from the outer and upper ends of each of said drums, and releasable clamping means engageable with said outer and upper ends of each said drum and said shell for securing said shell on said drum.

4. Apparatus for incising rectangular cross-section timbers, comprising: a main frame, a horizontal pair and a vertical pair of cylindrical opposed, spaced incising drums, each said drum having an outer peripheral shell carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, and power means for so moving said second and fourth carriage means to a spacing between said other drums and said table and fence, respectively, of substantially twice the length of the said rows of teeth on said one drums projecting respectively upwardly from said table and outwardly of said fence, means supporting said first and third carriage means for translatory movement of said one horizontal drum and said one vertical drum for adjusting the extent of projection of said teeth respectively above said table and outwardly of said fence.

5. Apparatus for incising rectangular cross-section timbers, comprising: a main frame, a horizontal pair and a vertical pair of cylindrical opposed, spaced incising drums, each said drum having an outer peripheral shell carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, and power means for so moving said second and fourth carriage means to a spacing between said other drums and said table and fence, respectively, of substantially twice the length of the said rows of teeth on said one drums projecting respectively upwardly from said table and outwardly of said fence, said teeth being axially spaced at substantially whole multiples of their widths, and the teeth of each said row being offset axially from the teeth of adjacent rows by substantially the width of a tooth.

6. Apparatus for incising rectangular cross section timbers, comprising: a main frame, a horizontal pair and a vertical pair of cylindrical opposed, spaced incising drums, each said drum having an outer peripheral shell carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, first power means for so moving said second and fourth carriage means to a spacing between said other drums and said table and fence, respectively, of substantially twice the length of the said rows of teeth on said one drums projecting respectively upwardly from said table and outwardly of said fence, means supporting said first and third carriage means for translatory movement of said one horizontal drum and said one vertical drum for adjusting the extent of projection of said teeth respectively above said table and outwardly of said fence, and second power means actuatable in increments of fractions of the height of said teeth projecting from said shell for so moving said first and third carriage means.

7. Apparatus for incising rectangular cross section timbers, comprising: a main frame, a horizontal pair and a vertical pair of cylindrical opposed, spaced incising drums, each said drum having an outer peripheral shell, carrying a plurality of axially extending rows of radially projecting, axially spaced incising teeth, a horizontal table supported on said frame and an elongated vertical fence mounted thereon, first and second carriage means rotatably mounting said horizontal drums projecting outwardly away from said fence with one of said horizontal drums positioned immediately below said table with its said teeth projecting thereabove and the other of said horizontal drums spaced thereabove, third and fourth carriage means rotatably mounting said vertical drums projecting upwardly from said table with one of said vertical drums positioned immediately inwardly of said fence with its said teeth projecting outwardly therefrom and the other of said vertical drums spaced outwardly thereof, the respective outer and upper ends of said other drums being free, means supporting said second and fourth carriage means on said frame for translatory movement of said other drums respectively upwardly from said table and outwardly from said fence, first power means for so moving said second and fourth carriage means to a spacing between said other drums and said table and fence, respectively, of substantially twice the length of the said rows of teeth on said one drums projecting respectively upwardly from said table and outwardly of said fence, means supporting said first and third carriage means for translatory movement of said one horizontal drum and said one vertical drum for adjusting the extent of projection of said teeth respectively above said table and outwardly of said fence, and second power means actuatable in increments of fractions of the height of said teeth projecting from said shell for so moving said first and third carriage means, and control means interconnecting said power means and responsive to movement of said first power means for actuating said second power means in a predetermined relationship.

8. In combination with apparatus in which a pair of horizontal and a pair of vertical cylindrical, opposed incising drums having radially projecting teeth are positioned to sequentially receive between the drums of each said pair an elongated timber of rectangular cross section for respectively incising the horizontal and vertical faces of such timber by penetration of said teeth, first carriages each supporting at least one drum of each said pair for movement toward and away from the respective other drum of each pair for accommodating timbers of varied widths and thicknesses therebetween, hydraulic cylinder means connected to each said first carriage for so moving said first carriage and its associated drum, and step control means connected to each said cylinder means for controlling the extent of movement of the same and operable in increments corresponding to the nominal widths and thicknesses of timbers to be so incised.

9. In combination with apparatus in which a pair of horizontal and a pair of vertical cylindrical, opposed incising drums having radially projecting teeth are positioned to sequentially receive between the drums of each said pair an elongated timber of rectangular cross section for respectively incising the horizontal and vertical faces of such timber by penetration of said teeth, first carriages each supporting at least one drum of each said pair for movement toward and away from the respective other drum of each pair for accommodating timbers of varied widths and thicknesses therebetween, hydraulic cylinder means connected to each said first carriage for so moving said first carriage and its associated drum, and step control means connected to each said cylinder means for controlling the extent of movement of the same and operable in increments corresponding to the nominal widths and thicknesses of timbers to be so incised, and means respective to movement of each said first carriage and connected to said control means for so operating the latter.

10. In combination with apparatus in which a pair of horizontal and a pair of vertical cylindrical, opposed incising drums having radially projecting teeth are positioned to sequentially receive between the drums of each said pair an elongated timber of rectangular cross section for respectively incising the horizontal and vertical faces of such timber by penetration of said teeth, first carriages each supporting at least one drum of each said pair for movement toward and away from the respective other drum of each pair for accommodating timbers of varied widths and thicknesses therebetween, hydraulic cylinder means connected to each said first carriage for so moving said first carriage and its associated drum, and step control means connected to each said cylinder means for controlling the extent of movement of the same and operable in increments corresponding to the nominal widths and thicknesses of timbers to be so incised, second carriages each supporting the said other drum of each said pair for movement toward and away from the respective one drum, adjustable force applying means for so moving each said second carriage and its associated drum fractional portions of the projecting length of said teeth for varying the depth of penetration of said teeth into such timber.

11. In combination with apparatus in which a pair of horizontal and a pair of vertical cylindrical, opposed incising drums having radially projecting teeth are positioned to sequentially receive between the drums of each said pair an elongated timber of rectangular cross section for respectively incising the horizontal and vertical faces of such timber by penetration of said teeth, first carriages each supporting at least one drum of each said pair for movement toward and away from the respective other drum of each pair for accommodating timbers of varied widths and thicknesses therebetween, hydraulic cylinder means connected to each said first carriage for so moving said first carriage and its associated drum, and step control means connected to each said cylinder means for controlling the extent of movement of the same and operable in increments corresponding to the nominal widths and thicknesses of timbers to be so incised, second carriages each supporting the said other drum of each said pair for movement toward and away from the respective one drum, adjustable force applying means for so moving each said second carriage and its associated drum fractional portions of the projecting length of said teeth for varying the depth of penetration of said teeth into such timber, and means interconnecting said control means and said force applying means for relating the depth of penetration of said teeth to the width and thickness of such timber.

12. Apparatus for incising timbers of rectangular cross section, comprising a first pair of spaced, parallel, cylindrical incising drums, a second pair of spaced, parallel, cylindrical incising drums having their axes extending normally to the axes of said first pair, means supporting each said drum for rotation about its own axis with one end of each drum of each pair respectively generally aligned with the periphery of one of the drums of the other pair, means mounting the other drum of each said pair for movement transversely of its axis to an outer position spaced from said one drum substantially twice the length of said drum, each said drum including a rotatable arbor supported at said one end with the other end free, means carrying radially projecting teeth received on said arbor and axially removable from said other end thereof, and releasable clamping means engageable with said other end of said arbor for securing said teeth carrying means thereon.

References Cited in the file of this patent

UNITED STATES PATENTS

| | | |
|---|---|---|
| 1,646,188 | Colman | Oct. 18, 1927 |
| 1,646,955 | Edwards et al. | Oct. 25, 1927 |
| 2,582,658 | Tackett | Jan. 15, 1952 |
| 2,821,220 | Nicholson | Jan. 28, 1958 |
| 2,903,934 | Montgolf et al. | Sept. 15, 1959 |

FOREIGN PATENTS

| | | |
|---|---|---|
| 137,911 | Great Britain | Jan. 29, 1920 |